(12) United States Patent
Nielsen et al.

(10) Patent No.: US 8,250,137 B1
(45) Date of Patent: Aug. 21, 2012

(54) PEER TO PEER COMPONENT DISTRIBUTION

(75) Inventors: Robert D. Nielsen, Cupertino, CA (US); Anders Bertelrud, Burlingame, CA (US); Kaelin Colclasure, Morgan Hill, CA (US); Nick G. Kledzik, Cupertino, CA (US); Guy L. Tribble, Hillsborough, CA (US)

(73) Assignee: Apple Inc., Cupertino, CA (US)

( * ) Notice: Subject to any disclaimer, the term of this patent is extended or adjusted under 35 U.S.C. 154(b) by 1130 days.

(21) Appl. No.: 11/230,076

(22) Filed: Sep. 19, 2005

(51) Int. Cl.
*G06F 15/16* (2006.01)

(52) U.S. Cl. ........ 709/203; 709/204; 709/223; 717/140; 717/176; 718/100; 718/102

(58) Field of Classification Search .................... 709/203
See application file for complete search history.

(56) References Cited

U.S. PATENT DOCUMENTS

| | | | | |
|---|---|---|---|---|
| 4,979,108 A * | 12/1990 | Crabbe, Jr. | .................... | 718/106 |
| 5,488,571 A * | 1/1996 | Jacobs et al. | .................. | 708/111 |
| 5,581,764 A * | 12/1996 | Fitzgerald et al. | ............ | 709/223 |
| 6,192,388 B1 * | 2/2001 | Cajolet | ......................... | 718/100 |
| 6,282,531 B1 * | 8/2001 | Haughton et al. | .............. | 706/50 |
| 6,654,954 B1 * | 11/2003 | Hicks | ............................. | 717/162 |
| 6,701,456 B1 * | 3/2004 | Biessener | ...................... | 714/20 |
| 7,174,385 B2 * | 2/2007 | Li | .................................. | 709/231 |
| 7,266,838 B2 * | 9/2007 | Foster et al. | ..................... | 726/6 |
| 7,523,317 B2 * | 4/2009 | Oswald et al. | ................. | 713/182 |
| 2002/0019844 A1 * | 2/2002 | Kurowski et al. | ............. | 709/201 |
| 2003/0195965 A1 * | 10/2003 | Choi et al. | ..................... | 709/227 |
| 2004/0261069 A1 * | 12/2004 | Verbeke et al. | ................ | 717/166 |
| 2005/0102253 A1 * | 5/2005 | Wu et al. | .......................... | 707/1 |
| 2005/0108433 A1 * | 5/2005 | Wu et al. | ....................... | 709/246 |

* cited by examiner

*Primary Examiner* — Hua Fan (74) *Attorney, Agent, or Firm* — Williams, Morgan & Amerson, P.C.

(57) ABSTRACT

A method, apparatus, and system are provided for assigning tasks and/or providing resources in a distributed system. An indication of a task being available for processing is provided to one or more remote systems in a distributed system based on a distribution list. At least one response from one of the remote systems capable of performing the task is received in response to the indication. The response includes a request for a resource for performing the task. The resource for performing the task is provided to the remote systems.

44 Claims, 6 Drawing Sheets

PEER TO PEER COMPONENT DISTRIBUTION

BACKGROUND OF THE INVENTION

1. Field of the Invention

The invention generally relates to assigning tasks for processing in a distributed system, and, in particular, to assigning tasks and/or resources for compiling in a distributed compilation system.

2. Description of the Related Art

Distributed computing has become increasingly popular with the maturation of network technology. Oftentimes, it is desirable to exploit the processing power of various networked machines that may otherwise be idle or under utilized. For example, it may be desirable to use the processing power of the networked machines to compute computationally taxing tasks, such as image processing or rendering, audio processing, video processing, encrypting, decrypting, and the like.

In a typical distributed computing environment, a central machine on a network divides a project into a number of tasks, which are assigned to one or more of the networked machines for processing or manipulation. The results are then returned to the central machine once the processing is complete. The assignment of tasks to the machines can be based on a number of criteria, including assigning the tasks in a simplistic round-robin fashion or based on some measure of predicted or historical performance (e.g., processor speed, available memory, etc.). These methods of assigning tasks can be costly in terms of overhead, and can often produce inefficient results.

Distributed systems are also employed in the context of software development. Many software development projects suffer from slow code compilation, which can result in longer "edit, compile, test" cycles, thereby extending the amount of time it takes for developers to deploy a finished software product. Whether it is a few hours' wait for a full product build, or a few minutes spent several times a day for an incremental build to finish, the persistent long delays associated with compilation can result in frustration, loss of productivity, and wasted time. To expedite the compilation process, practitioners have turned to distributed compilation systems, examples of which include TeamBuilder® and distcc. These distributed compilation systems improve compilation times by sharing the compilation processing across a group of networked machines. Like in other distributed systems, distributed compilation systems, such as distcc, employ a centrally controlled client machine, which is typically the developer's workstation or laptop. A distcc client runs on the client machine, along with command line tools, such as a preprocessor, a linker, and other tools employed in the software build process. Any number of "volunteer" machines assist the client to build the program by running the compiler and assembler as required.

In conventional distributed compilation systems, the client machine schedules tasks by assigning them to the volunteer machines. In some systems, clients may delegate tasks to the volunteer machines using a simplistic circular, round-robin scheme. In other systems, a client gathers information about the operational capabilities (e.g., processor speed, availability) of the various volunteer machines, and then assigns the tasks to the volunteer machines based on the operational capability of the volunteer machine. Each of these schemes, however, has its drawbacks.

A round-robin scheme is not particularly efficient for delegating tasks because of the potential mismatch between the amount of work load that is assigned to a particular volunteer machine and its processing capabilities. For example, based on a round-robin scheme, a client machine may delegate a task to a slower, less capable volunteer machine instead of another faster volunteer machine, simply because the slower machine is next in line to receive the task. Similarly, the client machine may routinely delegate a task to a volunteer machine that is presently overloaded over an under-utilized volunteer machine based simply on the relative position of the two volunteer machines in the round-robin scheme.

Like the round-robin scheme, schemes in which the client first gathers information about the various volunteer machines before work is assigned, also tend to be inefficient and inflexible. This is because the client machine (or another machine that is designated to gather the information) is constantly burdened with the responsibility of ascertaining the operational capabilities of the various volunteer machines on the network and then ensuring that these operational capabilities are up-to-date. Constantly maintaining an up-to-date list of the various volunteer machines can be inefficient, particularly if some of those volunteer machines are rarely or never utilized. Further, some of the volunteer machines may not possess adequate resources to perform the task. Keeping track of which particular voluntary machine has adequate resources can be cumbersome.

Problems associated with the state of the art distributed compilation system include the fact that various remote machines may not possess sufficient resources, such as the correct libraries, etc., to perform a requested task. Therefore, a machine providing the task request may assign a particular task to the volunteer machine without realizing that the volunteer machine may lack sufficient resources to perform the requested task. Further, it may appear to the client that the volunteer machine indeed contains adequate resources if the volunteer machine actually possesses outdated resources. The volunteer machine may then perform the task and send the results back to the client. Due to the outdated resources, the client may receive invalid task results, which may cause further errors during development of software, performance of graphics processing, audio processing, data processing, etc. Checking particular versions of the resources possessed by a volunteer machine and verifying appropriate resources may become overly cumbersome and may defeat the purpose of the efficiency sought as a result of implementing distributed compilation systems.

The present invention is directed to overcoming, or at least reducing, the effects of one or more of the problems set forth above.

SUMMARY OF THE INVENTION

In one aspect of the instant invention, a method is provided for assigning tasks and/or providing resources in a distributed system. The method includes indicating to one or more remote systems in a distributed system that a task is available for processing based on a distribution list and receiving at least one response from one of the remote systems capable of performing the task responsive to the indication. The response includes a request for a resource for performing the task. The method also includes providing the resource for performing the task to the remote systems.

In another aspect of the instant invention, a method is provided for assigning tasks and/or providing resources in a distributed system. The method includes providing an indication from a client system to a first remote system and to a second remote system in a distributed system that a task is available for processing based on a distribution list. The method also includes receiving a response the first remote system indicating that the first remote system is capable of performing the task responsive to the indication. The response includes a request for a resource for performing the task. The method also includes providing the resource from the second remote system or the client system to the first remote system in response to the request and allowing the first remote system to perform the task. The method also includes receiving a checksum from the first remote system. The checksum relating to the resource used to perform the task.

In another aspect of the instant invention, a method is provided for assigning tasks and/or providing resources in a distributed system. The method includes providing an indication to one or more remote systems in a distributed system that a task is available for processing based on a distribution list and receiving at least one response from one of the remote systems capable of performing the task responsive to the indication. The response includes a request for a resource for performing the task. The method includes providing the resource for performing the task to the remote system via a peer to peer connection and allowing at least one of the remote systems to perform the task based on the received response. The method also includes receiving a result of a completion of the task. The result includes a checksum associated with completion of the task. The checksum is indicative of the correctness of one or more resources utilized to perform the task.

In another aspect of the instant invention, a method is provided for assigning tasks and/or providing resources in a distributed system. The method includes providing an indication to one or more remote systems in a distributed system that a task is available for processing based on a distribution list and receiving at least one response from the remote systems capable of performing the task responsive to the indication. The method also includes allowing at least one of the remote systems to perform the task based on the received response and receiving a result of a completion of the task. The result includes a checksum associated with completion of the task. The checksum is indicative of the correctness of one or more resources utilized to perform the task.

In another aspect of the instant invention, a method is provided for assigning tasks and/or providing resources in a distributed system. The method includes receiving a request to process a task in a distributed system and providing at least one response to the request. The response includes a request for a resource for performing the task. The method also includes receiving the resource for performing the task via a peer to peer connection associated with the distributed system and performing the task. The method also includes providing a result of a completion of the task. The result includes data indicative of the correctness of one or more resources utilized to perform the task.

In yet another aspect of the present invention, a computer readable program storage device encoded with instructions is provided for assigning tasks and/or providing resources in a distributed system. The computer readable program storage device encoded with instructions that, when executed by a computer, performs a method, which comprises: indicating to one or more remote systems in a distributed system that a task is available for processing based on a distribution list; receiving at least one response from the one or more remote systems capable of performing the task responsive to the indication. The response includes a request for a resource for performing the task. The method performed by the device also includes providing the resource for performing the task to the remote system.

In yet another aspect of the instant invention, an apparatus is provided for assigning tasks and/or providing resources in a distributed system. The apparatus includes an interface adapted to communicate with one or more remote systems. The apparatus also includes a control unit communicatively coupled to the interface. The control unit adapted to indicating to one or more remote systems in a distributed system that a task is available for processing based on a distribution list; receive at least one response from the one or more remote systems capable of performing the task responsive to the indication, the response comprising a request for a resource for performing the task; and provide the resource for performing the task to the at least one of the remote system.

In yet another aspect of the instant invention, a distributed compilation system is provided for assigning tasks and/or resources. The distributed compilation system comprises one or more remote systems and a client system adapted to. The client system is adapted to: indicate to one or more remote systems in a distributed system that a task is available for processing based on a distribution list; receive at least one response from the one or more remote systems capable of performing the task responsive to the indication, the response comprising a request for a resource for performing the task; and provide the resource for performing the task to the at least one of the remote system.

BRIEF DESCRIPTION OF THE DRAWINGS

The invention may be understood by reference to the following description taken in conjunction with the accompanying drawings, in which like reference numerals identify like elements, and in which.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Embodiments of the present invention provide for a distributed system that is capable of assigning one or more tasks to one of a plurality of remote units, such as remote computers. A client system (i.e., a recruiter) may perform a multicast request for the completion of a task, e.g., a compilation task. The requested task may relate to a portion of a larger task. Embodiments of the present invention allow for an acquisition of resources to perform a task in a remote system. For example, a remote system (i.e., a volunteer) may respond to a multicast request for the completion of a task. This response may include a message indicating the availability for performing the task, as well as a general request to acquire resources to complete the task. The resources may be provided to the requesting remote system from one of a plurality of sources, such as another remote system or the client system.

Upon completion of the task by the remote system, one or more checksums or message digests may be transmitted along with the results of the task completion. Based upon the checksum, the client may make a determination as to whether the task was completed properly using appropriate resources. If proper resources were not used in performing the task, the client may perform a multicast request to re-perform the task. Additionally, the remote system may receive notification that its resources may not be updated. In response, the remote system may perform a multicast request for appropriate resources. Subsequently, a peer to peer transfer for resources may occur between any component of the distributed system and the requesting remote system.

Figure 1:
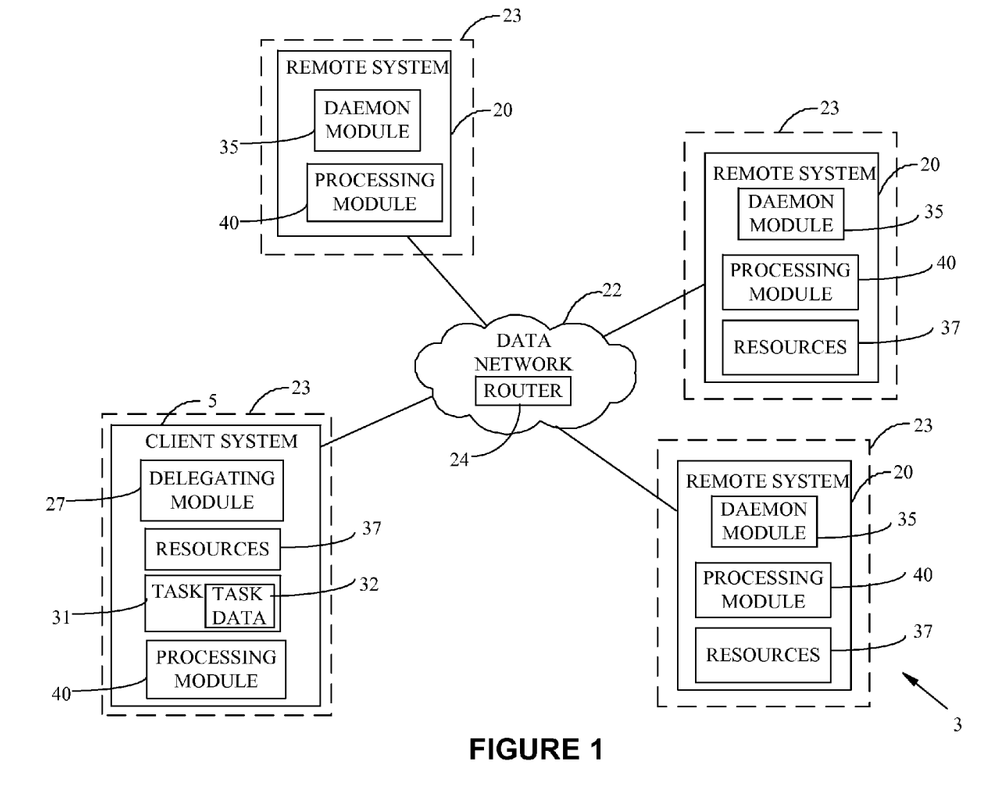
FIG. 1 is a block diagram of a distributed compilation system, in accordance with one illustrative embodiment of the present invention.

Turning now to FIG. 1, a distributed system in accordance with one illustrative embodiment of the present invention is provided. The distributed system 3 includes a plurality of systems, such as a client system 5 and remote systems 20, in which tasks may be assigned to one or more of the remote systems 20 by the client system 5. For example, in one embodiment, the distributed system 3 may be a distributed compilation system in which compilation tasks may be assigned to one or more of the remote systems 20 by the client system 5. The types of tasks that are assigned to the remote systems 20 by the client system 5 may vary, depending on the implementation. Examples of tasks that may be assigned include, but are not limited to, image processing or rendering tasks, audio processing tasks, video processing tasks, encrypting tasks, decrypting tasks, compilation tasks, data processing tasks, and/or other computationally intensive tasks.

As utilized herein, the term "client" may refer to a recruiter or a system that delegates one or more tasks to other systems for completion. The client system 5 may recruit a remote system 20 to perform a task. In response, the remote system 20 may volunteer to perform the task. Therefore, the client system 5 may be the recruiter and the remote system 20 may be the volunteer. For ease of illustration, the system 5 is designated as the "client" in FIG. 1, although it should be appreciated that any of the remote systems 20 may also be configured as a "client" so that it is able to delegate tasks to the other remote systems 20. Thus, the roles of client system 5 and remote systems 20 may vary over time in that the various systems may occasionally take on the role of client and at other times operate as a remote system. It may also be possible that, in some instances, a given system 5, 20 performs a dual role of a client system and a remote system by assigning tasks to other systems 5, 20 and, at substantially the same time, performing tasks for the other systems 5, 20.

The client system 5, in the illustrated embodiment, is coupled to the remote systems 20 over a data network 22. In one embodiment, the data network may be a peer to peer network. The systems 5 and 20 may be any processor-based system, such as computers in the form of desktops, laptops, mainframes, personal digital assistants, or the like. In one embodiment, the systems 5 and 20 may be located at various locations 23, which may be representative of different departments or centers of an organization, or, alternatively, different offices of an organization. Thus, for example, the locations 23, in one embodiment, may represent different offices/centers within a building, within one or more building complexes, within a city or country, or the like.

The data network 22 may be a public or a private network. Examples of the data network 22 may include local area networks (LANs), wide area networks (WANs), intranets, the Internet, peer to peer networks, or the like. The data network 22 may be a packet-switched data network, such as a data network according to the Internet Protocol (IP). As utilized herein, a "data network" may refer to one or more communication networks, channels, links, or paths, and systems or devices (such as routers) used to route data over such networks, channels, links, or paths. In the illustrated embodiment, at least one router 24 is shown. Although not so limited, in one embodiment, the router 24 may be utilized for the purpose of multicasting, as described later.

As described in greater detail below, in accordance with one embodiment of the present invention, the process of delegating (or scheduling) the tasks, such as compilation tasks, is at least partially shifted to (or shared with) the remote systems 20. In general, the client system 5 makes the remote systems 20 on the data network 22 aware of any task(s) requiring completion, and then receives responses from one or more of the remote systems 20 based on the capability and/or availability of that remote system 20. In this manner, the remote systems 20 that are relatively more capable (in terms of processing power and/or availability) of processing the tasks are likely to be more responsive to the client system 5. Thus, in accordance with one embodiment, the remote systems 20 are likely to be assigned tasks commensurate with their capability even though the client system 5 may have little or no prior knowledge of the capabilities of the responding remote systems 20.

In the illustrated embodiment, the client system 5 includes a delegating module 27 that indicates to the remote systems 20 that one or more tasks require completion. In one embodiment, the delegating module 27 of the client system 5 transmits a request to one or more of the remote systems 20 on the data network 22, informing the remote systems 20 of the pending task(s). The client system 5, in one embodiment, transmits the request to a plurality of remote systems 20 substantially simultaneously.

In one embodiment, the client system 5 may multicast the request to the remote systems 20 on the data network 22. For example, some embodiments of the present invention provide that the multicast request may refer to an address defined by the TCPIP standard, but are not so limited. In a multicasting embodiment, the client system 5 announces to the router 24 that one or more tasks require completion. The router 24, in turn, multicasts the announcement to the available nodes or remote systems 20 based on the remote systems 20 identified in a multicast group or distribution list. In one embodiment, the router 24 may dynamically update the contents of its multicast group. That is, as remote systems 20 become available or inaccessible, the router 24 updates its multicast group accordingly. In one embodiment, the multicast group or distribution list may contain destination addresses associated with each of the remote systems 20 included in the group or list. The router 24, in one embodiment, may substantially simultaneously indicate to the available remote systems 20 regarding the availability of task(s). In one embodiment, the router 24 may multicast the task notification to each of the available remote systems 20 using an efficient routing path.

If a particular node or remote system 20 can perform at least one task received in a multicast message, then, in one embodiment, that remote system 20 reserves one or more of its resources (discussed below), establishes a connection with the client system 5 to inform the client system 5 that it has the capability to perform the task, and awaits for the task to be assigned by the client system 5. The remote system 20 may also send a multicast message requesting a complete resource or an upgrade for a resource for performing the task. Another remote system 20 or the client system 5 may then provide the requested resource to the remote system 20 that made the resource request.

The connection established between the responding remote system 20 and the client system 5 may, in one embodiment, can be a unicast connection. The remote system 20 may perform the task once it has been assigned and thereafter provide the result(s) to the client system 5. The result(s) may include a checksum, which may contain various information relating to the completion of the task, including information relating to the resources that were used to perform the task. A checksum for each file associated with the task may be sent back to the client system 5.

In one embodiment, a multicast comprises sending a request to all subscribed members on a list. It may be desirable to use the multicast feature to announce the availability of task(s) to remote systems 20 because, in a multicast, the router 24 typically calculates, among other things, optimal paths for transmission, which in turn can reduce network usage.

In the illustrated embodiment of FIG. 1, the remote systems 20 include a daemon module 35, which executes on the remote systems 20, and responds to requests from the client system 5. For example, the daemon module 35 accepts compilation tasks from the client system 5, processes the tasks, and provides the compilation results to the client system 5. Although not shown, in one embodiment, the client system 5 may also include the daemon module 35.

The daemon module 35 may also perform a check to determine whether adequate or updated resources are available to perform a task, such as a compilation task. In one embodiment, this check may be based upon a message from a recruiter. If a determination is made that appropriate resources are not yet available, the daemon module 35 may perform a multicast request. This determination may be made by the remote system 20 or by the client system 5. In response to the multicast request for resources, the daemon module 35 may receive requested resources, such as updated libraries, header files for a program module to be compiled, updated GCC files, etc. The daemon module 35 may then forward the updated resource(s) to allow for completion of the task by the remote system. Additionally, the daemon module 35 may send back the completed task results along with a checksum dataset. The checksum may provide various indications, such as the identity of various resources used to perform the task, the state of information that is used to perform the task, other information relating to the data associated with the task, etc. The checksum is not limited to the examples listed herein, but may include a variety of information relating to the attributes of data relating to a file or a task. Based upon the checksum verification process (e.g., cache coherency checking process) performed by the client, it may make a determination as to whether the task was performed using appropriate resources.

In the illustrated embodiment, the daemon module 35 utilizes a processing module 40 executing on the remote systems 20 to complete the tasks that are assigned to the remote systems 20. In the context of a distributed compilation system, the processing module 40 may, for example, compile one or more source files to produce object code files. Examples of "source files" may include source code files, resource files, library files, headers, frameworks, or the like. The source code files may be written in one of several software languages, such as C, C++, Objective-C, Java, Pascal, Fortran, or any other desirable computer language. If the distributed system 3 is a distributed compilation system, the processing module 40 may perform a variety of other tasks, including linking files with object code segments to produce executable files, performing pre-processing tasks, assembling files, or the like. In the illustrated embodiment, the client system 5 also includes the processing module 40.

The delegating module 27, daemon module 35, and processing module 40, in the illustrated embodiment, are implemented in software. While these modules 27, 35, and 40 are illustrated as three distinct modules for the purposes of this discussion, it should be appreciated that some or all portions of these modules may be combined or expanded into any number of module(s). The modules 27, 35, and 40 in the illustrated embodiment are executable on the systems 5 and 20, each of which may be, for example, a laptop computer, a desktop computer, a mainframe computer, a handheld device, or any other processor-based system capable of executing instructions. In alternative embodiments, some or all portions of one or more of these modules 27, 35, 40 may be implemented in hardware or firmware.

In one embodiment, when a remote module 20 volunteers or notifies the client 5 that it is available to perform a task that was already assigned to a different remote module 20, the client 5 may also assign the task to the second remote module 20. This redundant assignment is particularly performed if the client system 5 has no tasks to assign when the second remote system 20 volunteers for a previously announced task. When a correct result is first received from either one of the two remote modules 20 performing the same task, the result is used by the client 5. In this manner, wait time for reception of a completed task may be reduced.

For clarity, only selected components of the client system 5 and remote systems 20 are shown, although it should be appreciated that these systems 5 and 20 may include other components, depending on the implementation. For example, in the context of a compilation system, the systems 5 and 20 may include components such as an editor, a linker, an assembler or the like to build software applications.

Figure 2:
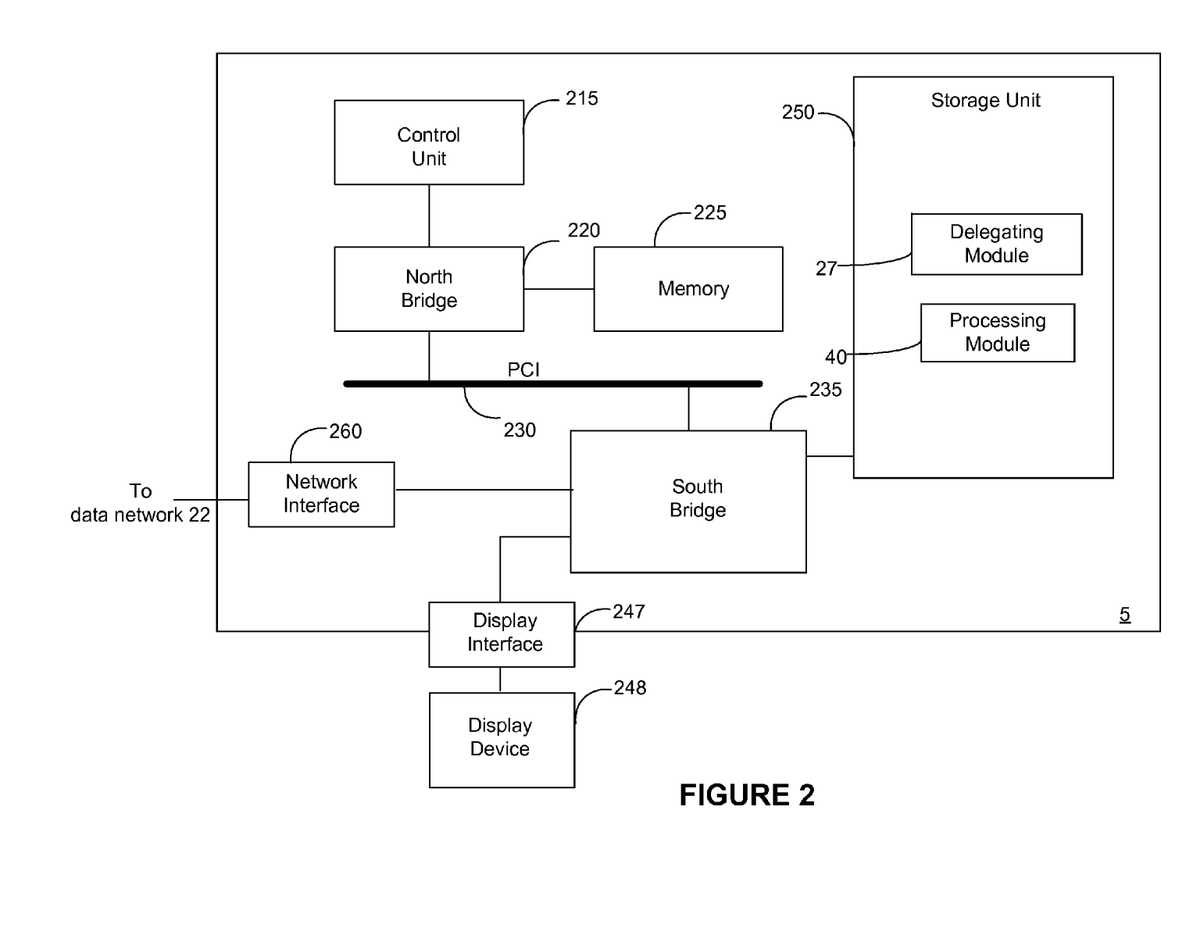
FIG. 2 is a block diagram of a client system that may be employed in the distributed compilation system of FIG. 1, in accordance with one illustrative embodiment of the present invention.

Referring now to FIG. 2, a stylized block diagram of the client system 5 of FIG. 1 is illustrated, in accordance with one embodiment of the present invention. The client system 5 comprises a control unit 215, which in one embodiment may be a processor, and is capable of interfacing with a north bridge 220. The north bridge 220 provides memory management functions for a memory 225, as well as serve as a bridge to a peripheral component interconnect (PCI) bus 230. In the illustrated embodiment, the client system 5 includes a south bridge 235 coupled to the PCI bus 230.

A storage unit 250 is coupled to the south bridge 235. The delegating module 27 and the processing module 40 are storable in the storage unit 250 and executable by the control unit 215. In one embodiment, if the client system 5 includes the daemon module 35, it may also be stored in the storage unit 250 and executed by the control unit 215. Although not shown, it should be appreciated that in one embodiment, an operating system, such as Windows®, Disk Operating System®, Unix®, Linux®, MAC OS®, or the like, may be stored on the storage unit 250 and executable by the control unit 215. The storage unit 250 may also include device drivers for the various hardware components of the client system 5.

In the illustrated embodiment, the client system 5 includes a display interface 247 that is coupled to the south bridge 235. The client system 5 may display information on a display device 248 via the display interface 247. The south bridge 235 of the client system 5 may include a controller (not shown) to allow a user to input information using an input device (not shown), such as a keyboard and/or a mouse.

The south bridge 235 of the client system 5, in the illustrated embodiment, is coupled to a network interface 260, which may be adapted to receive, for example, a local area network card. In an alternative embodiment, the network interface 260 may be a Universal Serial Bus interface or an interface for wireless communications. The client system 5 communicates with the remote system 20 coupled to the data network 22 through the network interface 260.

It should be appreciated that the configuration of the client system 5 of FIG. 2 is exemplary in nature and that, in other embodiments; the client system 5 may include fewer, additional, or different components without deviating from the spirit and scope of the present invention. For example, in an alternative embodiment, the client system 5 may not include a north bridge 220 or a south bridge 235, or may include only one of the two bridges 220, 235, or may combine the functionality of the two bridges. As another example, in one embodiment, the client system 5 may include more than one control unit 215. Similarly, other configurations may be employed consistent with the spirit and scope of the present invention.

In one embodiment, the remote systems 20 may include a similar configuration as the client system 5 of FIG. 2. For the remote systems 20, the daemon module 35 (see FIG. 1) may be stored in the storage unit 250 and executed by the control unit 215. The term "daemon module," as utilized herein, may refer to any software module or application that is executable by the control unit 215.

Figure 3:
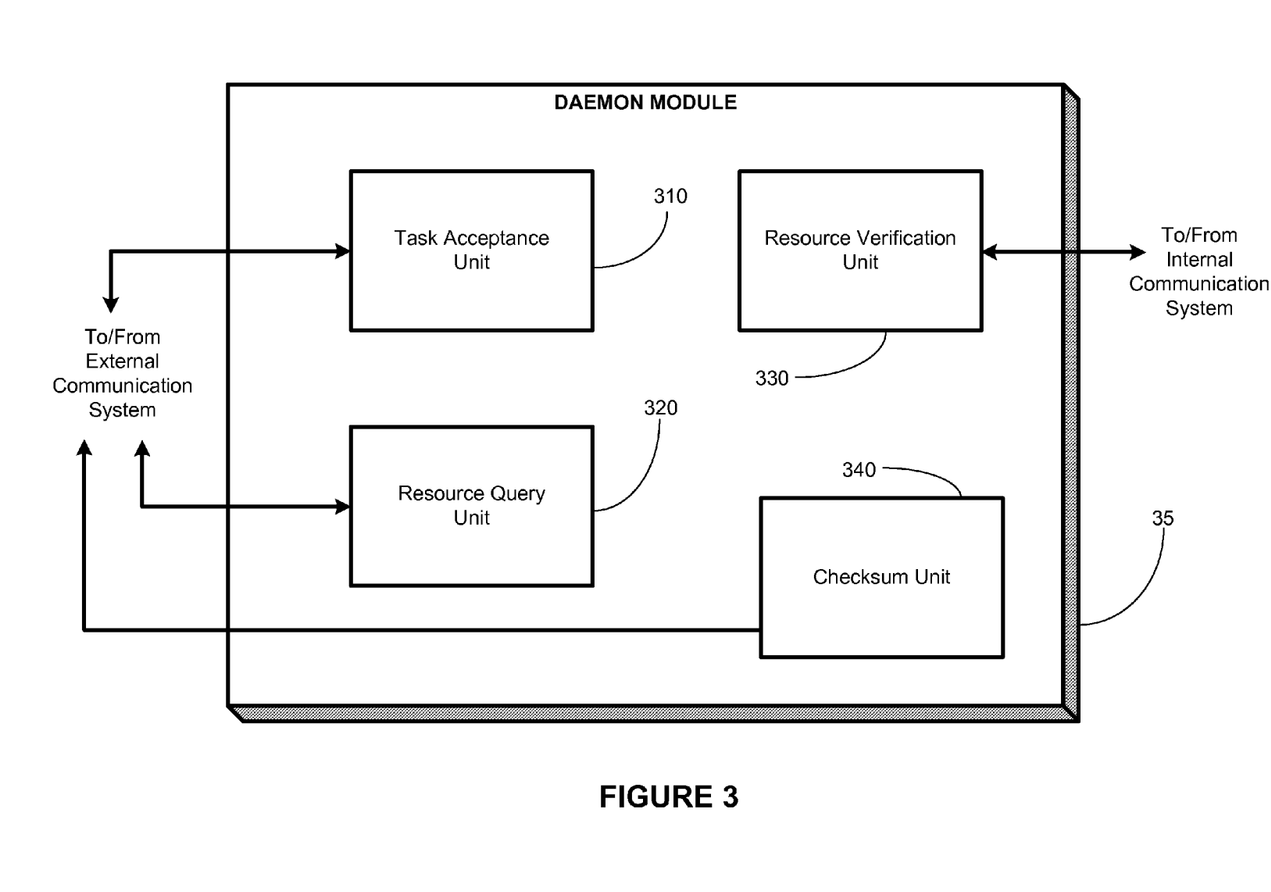
FIG. 3 depicts a more detailed block diagram depiction of a daemon illustrated in FIG. 1, in accordance with one illustrative embodiment of the present invention.

Turning now to FIG. 3, a more detailed block diagram depiction of the daemon module 35, in accordance with one embodiment of the present invention is provided. In one embodiment, the daemon module comprises a task acceptance unit 310, a resource verification unit 320, a resource query unit 330, and a checksum unit 340. The task acceptance unit 310 may provide an indication of an acceptance of a compilation task from the client system 5. In one embodiment, the remote systems 20 or any other portion of the system 5 may recognize that the remote system 20 that accepted the task request may lack at least one resource required to correctly perform the task. In an alternative embodiment, based upon a task request from the client system 5, the resource verification unit 320 may perform an internal query of the remote system 20 to determine whether appropriate resources exist in the remote system 20 to perform the requested tasks. This may include verifying the version of the resource libraries, etc.

When a determination is made that the remote systems 20 do not include adequate or specified resources to perform the requested task, the resource query unit 330 may perform a query over the data network 22 to locate certain resources. This query may also include deciphering any messages from a recruiter regarding un-updated resources that were used, based upon analysis of the checksum(s). The router 24 is capable of routing this query in a multicast fashion. Another remote system, or the client system 5, that is operatively coupled to the data network 22 may respond and provide the requested resources to the requesting remote systems 20. This transfer of resources may occur in a peer to peer protocol. The router 24 is capable of routing data relating to the resources, to the requesting remote systems 20. Therefore, based upon the internal communications and the external communications performed by the daemon module 35, appropriate resources may be used by the remote systems 20 to perform the requested task.

The daemon module 35 may also comprise a checksum unit 340 to provide data for a checksum dataset to be sent back to the client along with the task results. Each file associated with the processed task may be accompanied with a corresponding checksum. In an alternative embodiment, any one of the units 310-340 described as being part of the daemon module 35, may be implemented into any other portion of the remote system 20 and remain within the spirit and scope of the present invention.

In one embodiment, the remote systems 20, or volunteers, compile a list of resources that are to be part of the checksum data. In one embodiment, when tasks are performed by the remote system 20, the daemon module 35 logs data relating to the resources that are used to perform the task(s). In an alternative embodiment, another portion of the remote system 20 may perform this task. In one embodiment, the tasks performed by the remote systems 20 may be performed or executed in an environment where access to file-system resources may result in an "audit trail" of the resources that we used to perform the tasks. Data relating to the logging of the resource information and/or the audit trail containing information regarding the resources, are part of the checksum. Information regarding the audit trail may be used by the client system 5 to validate the results of the tasks performed by the remote system(s) 20.

Figure 4:
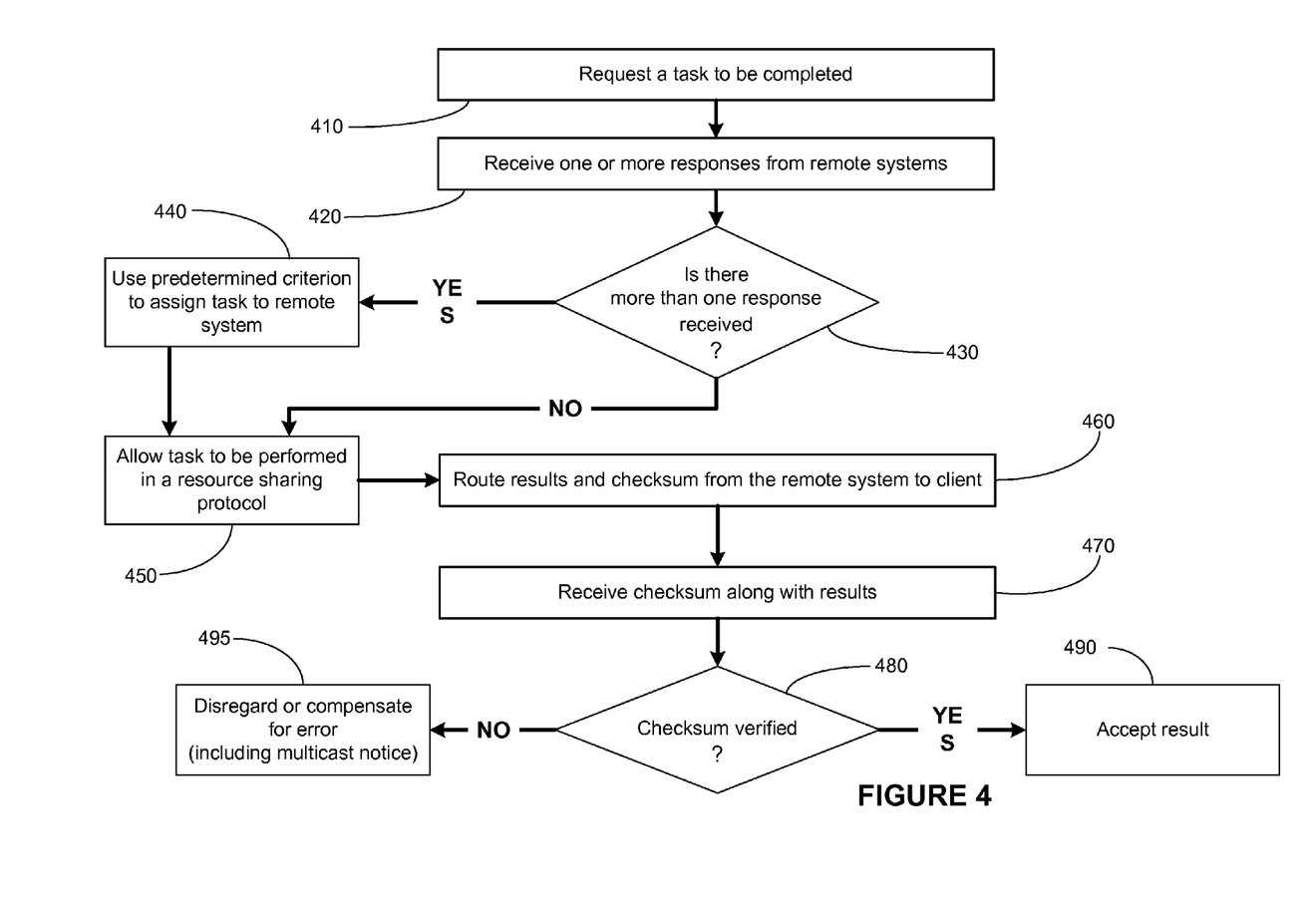
FIG. 4 is an illustration of a flowchart depiction for performing one or more acts by a delegating module executing on the client system of FIG. 2, in accordance with one embodiment of the present invention.

Turning now to FIG. 4, a flowchart depiction of the steps associated with the method in accordance with one illustrative embodiment of the present invention is provided. Although, as noted, any one or more of a variety of tasks may be assigned by the delegating module 27, for illustrative purposes the flowchart depicted in FIG. 4 is described in the context of a distributed compilation system. The delegating module 27 of the client system 5 indicates to the remote systems 20 that a compilation task requires completion (block 410). In one embodiment, if the client system 5 has more than one task that requires completion, the client system 5 can indicate that a plurality of compilation tasks needs processing. The tasks to be performed may be posted by the client system 5, for example, in a queue, which may be accessible by the remote systems 20.

Figure 5A:
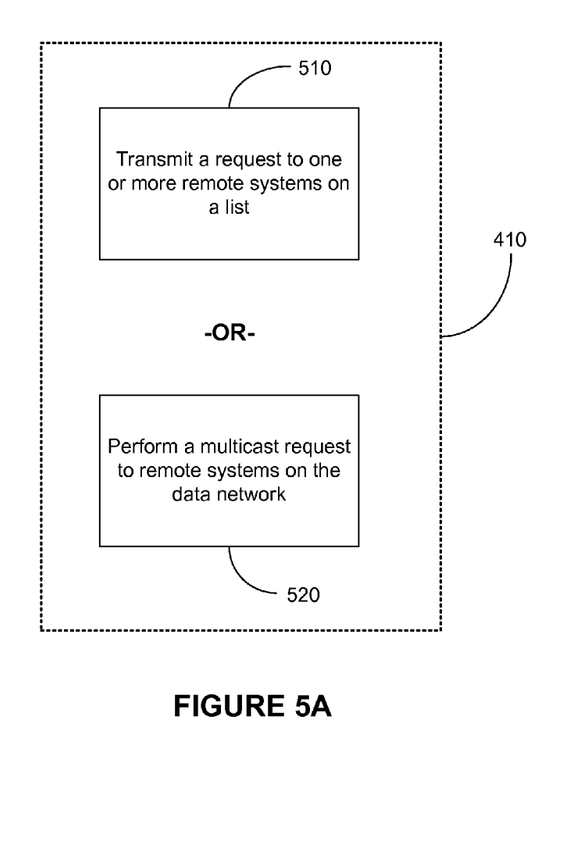
FIG. 5A illustrates a flowchart depiction of various possibilities associated with receiving a request for task completion described in FIG. 4, in accordance with one illustrative embodiment of the present invention.

The client system 5 may indicate (at block 410) to the remote systems 20 in a variety of ways that a task requires completion, as described in FIG. 5A. Referring simultaneously to FIGS. 4 and 5A, for example, in one embodiment, the delegating module 27 may transmit a request to select remote systems 20, e.g., a group of selected remote systems 20 on a predetermined list (block 510). In another embodiment, the delegating module 27 may perform a multicast request directed to various remote systems 20 that are operatively coupled to the data network 22 (block 520). The select remote systems 20 may be identified, for example, based on a pre-stored (or dynamically created) list of identities of remote systems 20 that is accessible to the client system 5.

In accordance with one embodiment of the present invention, the request provided (at blocks 510 and/or 520) by the client system 5 may identify the remote systems 20 that may respond to the request. That is, in one embodiment, the request from the client system 5 may specify that only those remote systems 20 satisfying a particular threshold criterion (or criteria) may respond to the request. The threshold criterion may be based on definitive criteria (such as hardware configuration of a remote system 20, e.g., processing speed, memory size, resource availability to perform the task, etc.), more fluid criteria (such as the operational load of the remote system 20 at a given time), or a combination of any portion(s) of both. As an example, the client system 5 may require that only remote systems 20 with a CPU having a minimum operating frequency of at least 2 gigahertz respond to the request. As another example, the client system 5 may require that only remote systems 20 with updated library files and header files respond to the request.

In other embodiments, the client system 5 may require that the responding remote systems 20 have memory of at least a particular size or a network adapter of a particular speed, etc. In one embodiment, the client system 5 may define the criteria based, for example, on the complexity of the task to be assigned. It should be appreciated that criteria defined to select remote systems 20 is a matter of design choice, and may vary from one implementation to another. In one embodiment, the client system 5 may not provide any criteria and may thus select one or more remote systems 20 from those that respond to the request.

The request transmitted by the client system 5 is received by the daemon module 35 of the remote systems 20. As noted, the request may be transmitted to select remote systems 20 or multicast to all of the remote systems 20 on the data network 22. The daemon module 35, upon receiving the request, responds to the client system 5 if the remote system 20 is available to perform the compilation task. If the request that is transmitted by the client system 5 specifies a threshold criterion or criteria for responding, then the daemon module 35, in one embodiment, responds only if the remote systems 20 satisfy that criterion or criteria. In one embodiment, the act of responding to the client system 5 may include the remote systems 20 selecting the task that requires processing from, for example, a queue in which that compilation task is posted. The act of responding may also include requesting certain resources to perform the task. However, this request may be made separately.

In one embodiment, before responding to a request, the daemon module 35 reserves resource(s) (or locks down) of the remote system 20 to perform the task(s) for the client system 5. Reserving the resource(s) may be desirable to ensure that the remote system 20 has adequate resource(s) available to process the task(s) for the client system 5. Thus, for example, in instances where the remote system 20 may receive multiple requests from various client system 5 in the distributed system 3, it may be desirable to ensure that the remote system 20 does not over commit the resources such that it is incapable of timely processing the task(s) for a given client system 5. Reserving a resource of the remote systems 20 may include, for example, adjusting (e.g., reducing) the number of responses the remote systems 20 may transmit to other client system 5 as the remote system 20 responds to a given client system 5.

In accordance with one embodiment of the present invention, each of the responding remote systems 20 may provide information regarding its configuration or operational characteristics. For example, a responding remote system 20 may provide configuration information such as its processor speed, memory size, network card speed, gcc, library files, compilation header files, and/or the like, to the client system 5. As another example, a responding remote system 20 may provide operational characteristic information such as its current load or the quality of the communications channel. This information may be utilized by the client system 5 to determine which remote system 20 should be assigned the compilation task in case the client system 5 receives multiple responses from the qualifying remote systems 20. Because information regarding the configuration and/or operational characteristic of the remote system 20 in one embodiment is provided by the remote system 20 itself, the client system 5 does not have to expend its resources in maintaining a database (or a repository) of the remote systems 20. The type of configuration information or the operational characteristic information provided by the remote systems 20 may vary from implementation to another. In one embodiment, the remote systems 20 may not provide any such information while responding to the request from the client system 5.

Once the remote systems 20 respond to the request from the client system 5, these response(s) are received by the delegating module 27 of the client system 5 (block 420). The delegating module 27, in one embodiment, determines if more than one response is received (block 430). If only a single remote system 20 responds to the request transmitted by the client system 5, then, in one embodiment, the client system 5 allows the responding remote system 20 to perform the task in a resource-sharing protocol (block 420). The resource-sharing protocol allows for the assigned remote system 20 to receive resources from other remote systems 20 and/or the client system 5. A more detailed description of the resource-sharing protocol of block 420 is provided in FIG. 6 and accompanying description below. If no responses are received, then the client system 5 may perform the task itself.

Figure 5B:
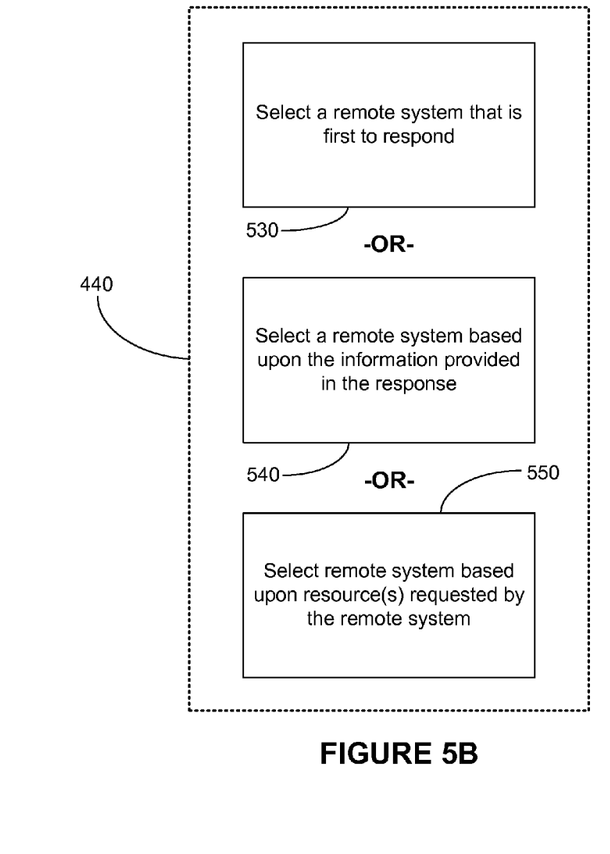
FIG. 5B illustrates a flowchart diagram depiction of various possibilities associated with assigning a task to a remote system described in FIG. 4, in accordance with one illustrative embodiment of the present invention.

If, however, it is determined that more than one remote system 20 responded, the delegating module 27 determines which of the responding remote systems 20 should be assigned the task. In one embodiment, using a predetermined criterion, the delegating module 27 may select a remote system 20 based on a priority (or selection) scheme (block 440). Referring simultaneously to FIGS. 4 and 5B, for example, in one embodiment, the delegating module 27 may select a remote system 20 based on the order in which the response(s) were received (i.e., first-come, first-served basis) (block 530). In another embodiment, the client system 5 may select a remote system 20 based on the information provided in the response(s) (block 540). For example, if two remote systems 20 with fast processors respond, but one of the remote systems 20 has twice the memory as the other, then the client system 5 may select the remote system 20 with a larger memory. In yet another embodiment, two or more remote systems 20 respond, the client system 5 may select the one that has appropriate resource(s) by examining whether any resources were requested by the responding remote systems 20 (block 550).

In alternative embodiments, the client system 5 may select the remote system 20 based on any other type of information provided in the response(s) by the remote systems 20, such as load level, operating system, or the like. In yet another embodiment, the client system 5 may select the remote system 20 based on performance characteristics of the remote systems 20. That is, if desired, the client system 5 may maintain performance characteristics of the remote systems 20 based on past assignments to select a particular remote system 20. Thus, for example, a remote system 20 having a track record of completing compilation task(s) quicker than other remote systems 20 may be selected over other remote systems 20. As another example, a remote system 20 having a track record of delivering checksums (relating to task completions) that are often correctly verified may be selected over other remote systems 20. The client system 5 may maintain the performance characteristics (e.g., compilation times) and/or a checksum verification rate on a compilation project basis or on any other time interval or event basis. Upon selection of the remote system 20 for assignment of the task, the delegating module 27 allows the remote system 20 to perform the task in a resource-sharing protocol (block 450), which is further described below. The resource sharing protocol may refer to a protocol that allows for any remote system 20 to perform a multicast request for any number of resources that may should be updated or acquired to perform the assigned task. In one embodiment, this request may not be made until the checksum is analyzed and a resource problem is detected.

As described above, if multiple responses are received from the remote systems 20, the client system 5 may assign a task to the one or more of the responding remote systems 20. That is, if the client system 5 has more than one task available for processing, these tasks may be delegated, if desired, to the various remote systems 20 that respond. If the client system 5 has no task to assign to one or more of the remote systems 20 that respond, then, in one embodiment, the client system 5 provides an indication to these remote systems 20 that a task is not available for processing. Based on this indication, a remote system 20 may release any resources it may have allocated to complete the task for the client system 5.

If the client system 5 has various tasks being processed by the various remote systems 20 in the distributed system 3, the client system 5, in one embodiment, tracks the processing of these tasks. That is, the client system 5, for each task, may track which remote system 20 is processing that task. The client system 5 may also, on a periodic basis or as requested by a user, request status of the processing of the tasks from the various remote systems 20. In this manner, a user can use the client system 5 to readily track the processing state of each task being processed by the remote systems 20 of the distributed system 3.

The daemon module 35 of the remote system 20 that is allowed to process the task performs the task using the processing module 40 of that remote system 20 and provides the results to the client system 5. The task results and related checksums(s) are routed such that the client system 5 receives the results (block 460). The results in one embodiment may include one or more object code files. In another embodiment, depending on the particular task assigned, the remote system 20 may compile the source code, link the object code, and then provide the results in the form of executable files to the client system 5. The results may also include a checksum relating to the completion of the task. In an alternative embodiment, the checksum may be sent separately to the client system 5. Along with the checksum may include exit codes, data relating to input files, output files, message digest, gcc data, library file data, data relating to a header file used to perform compilation, etc. In an alternative embodiment, any one of these items may be part of the checksum or sent separately to the client system 5.

In one embodiment, if the number of responding remote systems 20 exceeds the number of available tasks, the client system 5 may assign the same task to multiple remote systems 20, and then accept the results from the first remote system 20 to provide the results. Once the results have been received from at least one of the responding remote systems 20, the client system 5 may thereafter ignore the results from other remote systems 20, or, alternatively, notify these remote systems 20 that the results are no longer needed. This decision may be based upon proper verification of the checksum.

In some instances, a particular remote system 20 that is assigned a task may not successfully complete that task for a variety of reasons, including hardware failure, for example. Additionally, the checksum may indicate that inappropriate resources were used to perform the task, rendering the results invalid. In one embodiment, if an assigned task is not completed successfully, or the checksum is not validated, the client system 5 may repost the task in a queue and announce to the other remote systems 20 that a task is available for execution. Thus, in one embodiment, a provision is made for the client system 5 to reassign a previously uncompleted task or invalidly completed task to another remote system 20. In one embodiment, the client system 5 may identify unsuccessfully completed tasks based on a timing scheme (i.e., the execution of the task may be deemed to be incomplete if the results from the remote system 20 are not received within a preselected amount of time), based on a message exchange scheme (i.e., the client system 5 determines if the remote system 20 is responsive based on exchange of messages), and/or based upon the checksum. The client system 5 may also notify the particular remote system 20 that provided the invalid task results that the resources that were used were incorrect. In response the remote system 20 may post a multicast request to acquire proper resource(s). The remote system 20 may receive the requested resource from another entity that is operatively coupled to the data network 22 in a peer to peer fashion.

In accordance with one or more embodiments of the present invention, an efficient way of delegating tasks in a distributed system is provided. Among other things, one or more of the described embodiments may be well-suited for processor-intensive tasks and "busy" networks. The described embodiments may also provide various failsafe mechanism, such as redundant task assignment. In one embodiment, the remote systems 20 assist the client system 5 in performing compilation task(s). In general, the client system 5 makes the remote systems 20 on the data network 22 aware of any task(s) requiring completion, and then receives responses from one or more of the remote systems 20 based on the capability and/or availability of that remote system 20. In this manner, remote systems 20 that are relatively more capable (in terms of processing power and/or availability) of processing the tasks respond to the request from the client system 5.

Upon completion of the task, the client system 5 may receive the results and the checksum for each file associated with the task (block 470). The client may then determine whether the details relating to the checksum is verified (block 480). In other words the checksum is used to determine the coherency of the cache of the remote system 20 and the client system 5. If the system 3 verifies various details relating to the checksum, the client 5 accepts the results of the task (block 490). However, if the client 5 is not able to verify some or all of the checksum dataset, the client 5 may disregard result or compensate for any error in the process results (block 495).

For example, if a wrong header for a C++ module was used when a compilation task was performed on the module, the task results may be disregarded. However, if an indication is provided that the checksum mismatch occurred due to a minor issue relating to a factor of the checksum, corrective actions to modify the test results or deletion of only a portion of the test results may be performed. If the checksum is not properly verified, then the client system 5 may perform a multicast request to re-perform the task. Additionally, the client system 5 may alert the remote system 20 that performed the task its resources does not match the resources of the client system 5 (e.g., an alert is provided indicating the there lacks a cache coherency). In response to this message, the remote system 20 may perform a multicast request for the correct resources. The system 3 may then cause the routing of the proper resources from any component of the system 3, to the requesting remote system 20.

Figure 6:
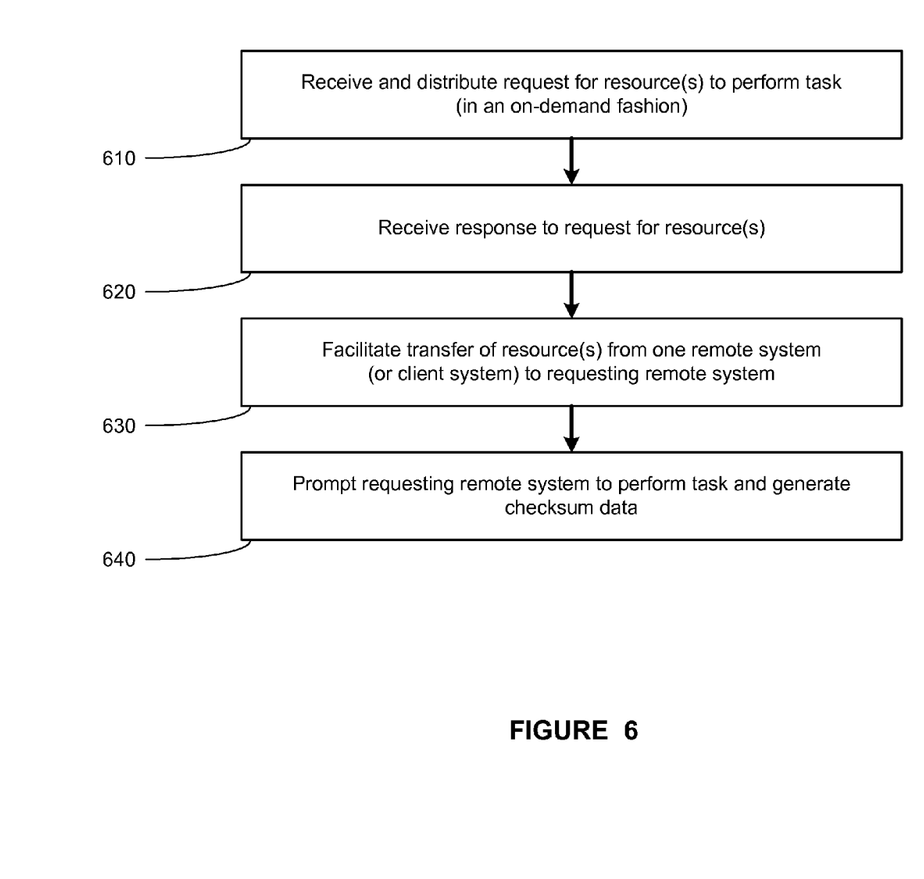
FIG. 6 illustrates a flowchart depiction of the step of allowing a task to be performed in a resource-sharing protocol, as indicated in FIG. 4, in accordance with one illustrative embodiment of the present invention.

Turning now to FIG. 6, a more detailed flowchart depiction of performing the task within the resource-sharing protocol, in accordance with one embodiment of the present invention, is provided. In one embodiment, after receiving a task request from the client system 5, the distributed system 3 routes a request for resource(s) from one or more remote systems 20 to various components of the system 3 (block 610). In one embodiment, the request for resource(s) may be transmitted to the client system 5 and to select remote systems 20 or multicast to all of the remote systems 20 on the data network 22. The data network 22 provides for the remote systems 20 and the client system 5 to receive the request for the resource (s) (block 620).

In response to the request for resource(s), the requested resource is transferred from one of the remote systems 20 or the client system 5 to the requesting remote system 20 (block 630). This transfer may occur within a peer to peer protocol. In one embodiment, this transfer may be made on an on-demand basis, wherein the requested resource(s) are sent to the requesting remote system 20 upon demand. Upon providing the requested resource(s) to the requesting remote system 20, it is prompted to perform the task and generate a result, which may also include a checksum for each file associated with task result (block 640). The client system 5 then accepts or rejects the results based upon the checksum and/or a plurality of other factors described above.

Utilizing embodiment of the present invention, a remote system 20 is capable of a multicast request for resources. Therefore, if one remote system 20 obtains the appropriate resources, other remote systems 20 that are operatively coupled to the data network 22 may also acquire such data resources to perform the requested task. Therefore, utilizing the embodiments of the present invention more efficient performance of distributed tasks management may be performed. Therefore, remote systems 20 that do not possess adequate resources to perform a task may be able to efficiently acquire resources from one of a number of remote systems 20 or alternatively, from the client system 5.

Those skilled in the art will appreciate that the various system layers, routines, or modules illustrated in the various embodiments herein may be executable control units (such as the control unit 215 (see FIG. 2). The control unit 215 may include a microprocessor, a microcontroller, a digital signal processor, a processor card (including one or more microprocessors or controllers), or other control or computing devices. The storage devices 250 referred to in this discussion may include one or more machine-readable storage media for storing data and instructions. The storage media may include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy, removable disks; other magnetic media including tape; and optical media such as compact disks (CDs) or digital video disks (DVDs). Instructions that make up the various software layers, routines, or modules in the various systems may be stored in respective storage devices. The instructions when executed by a respective control unit 215 causes the corresponding system to perform programmed acts.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method, comprising:
indicating to one or more remote systems in a distributed system that a task is available for processing based on a distribution list;
receiving at least one response from said one or more remote systems capable of performing the task responsive to the indication, said response comprising a request for a resource for performing said task, wherein the task is performed upon task information, and wherein the resource is information, other than the task information, used to perform the task;
providing said resource for performing said task to said at least one of said remote systems;
prompting at least the requesting remote system to perform the task in response to providing the resource;
receiving data relating to the resource used to perform said task;
determining, based upon the received data relating to the resource used to perform said task, whether the resource used to perform the task was a proper resource based at least upon a checksum received from at least the requesting remote system; and
indicating to the one or more remote systems, in response to determining that proper resources were not used to perform the task, that the task is available for processing.

2. The method of claim 1, further comprising allowing at least one of the remote systems to perform the task based on said received response.

3. The method of claim 2, further comprising receiving a result of a completion of said task, said result comprising a checksum associated with completion of said task, said checksum being indicative of an accuracy associated with one or more resources utilized to perform said task.

4. The method of claim 3, further comprising discounting the accuracy of said result of said completion of the task based upon the checksum.

5. The method of claim 2, wherein said distribution list comprises destination addresses associated with one or more remote systems, wherein indicating to said one or more remote systems comprises providing a message to a router that, responsive to the message, transmits at least a portion of the message to a plurality of the remote systems based on the distribution list.

6. The method of claim 2, wherein said task is at least one of a compilation task, a video processing task, an audio processing task, an image processing task, an encryption task, decryption task, and a word processing task, and wherein indicating to said one or more remote systems comprises indicating a threshold criterion that said one or more remote systems should satisfy, and wherein receiving said at least one response comprises receiving said at least one response from said one or more remote systems that satisfy the threshold criterion.

7. The method of claim 6, wherein indicating the threshold criterion comprises indicating at least one of a preselected processing speed, a memory size, a resource availability to perform said task, and a network speed that is desired for said one or more remote systems.

8. The method of claim 7, wherein receiving said at least one response comprises receiving configuration information associated with said one or more remote systems.

9. The method of claim 8, wherein receiving said configuration information comprises receiving information including at least one of a processing speed, a memory size, a network speed, resource availability to perform said task, and a load level associated with said one or more remote systems.

10. The method of claim 8, wherein allowing at least one of the remote systems to perform the task comprises allowing at least one of the remote systems to perform the task based on a selection scheme.

11. The method of claim 10, wherein said selection scheme comprises at least one of allowing a remote system that responds first to perform the task and allowing a remote system to perform the compilation task based on the received configuration information.

12. The method of claim 1, wherein said act of indicating comprises indicating that the compilation task is available for processing, and wherein the act of receiving comprises receiving at least one response from a remote system that has reserved at least a portion of its resources for performing the task.

13. The method of claim 1, wherein providing said resource for performing said task to said at least one of said remote system comprises providing said resource from at least one of a second remote system and a client system to said at least one of said remote system.

14. The method of claim 13, wherein providing said resource further comprises providing said resource via a peer to peer platform.

15. The method of claim 13, wherein providing said resource further comprises providing at least one of an updated GCC, an updated library file, an updated header file, and an execution file.

16. A method, comprising:
providing an indication from a client system to a first remote system and to a second remote system in a distributed system that a task is available for processing based on a distribution list;
receiving a response from said first remote system indicating that said first remote system is capable of performing the task responsive to the indication, said response comprising a request for a resource for performing said task, wherein the task is performed upon task information, and wherein the resource is information, other than the task information, used to perform the task;
providing said resource from at least one of said second remote system and said client system to said first remote system in response to said request;
allowing said first remote system to perform said task, wherein allowing is based upon at least one past performance characteristic of the remote system;
receiving data relating to said resource used to perform said task;
determining, based upon the received data relating to the resource used to perform said task, whether the resource used to perform the task was a proper resource based at least upon a checksum received from the first remote system; and
indicating to the first and second remote systems, in response to determining that proper resources were not used to perform the task, that the task is available for processing.

17. The method of claim 16, providing said resource from at least one of said second remote system and said client system to said first remote system comprises providing said resource in a peer to peer protocol.

18. A method, comprising:
routing a signal indicating that a task is available for processing from a client system to a first remote system and a second remote system based upon a distributed system;
routing at least one response from at least one of said first and second remote systems capable of performing the task responsive to the indication to said client system, said response comprising a request for a resource for performing said task, wherein the task is performed upon task information, and wherein the resource is information, other than the task information, used to perform the task;
routing said resource for performing said task from at least one of said client system, said first remote system, and said second remote system, to said at least one of said first and second remote systems;
routing data relating to the resource used to perform said task from at least one of said first remote system and said second remote system to at least the client system; and
routing checksum data indicative of a determination whether the resource used to perform the task was a proper resource from at least one of said first remote system and said second remote system to at least the client system; and
routing a signal indicating to the first and second remote systems, in response to determining that proper resources were not used to perform the task, that the task is available for processing.

19. The method of claim 18, wherein further comprising allowing at least one of said first and second remote systems to perform said task based on said received response, wherein performing said task comprising generating an audit trail relating to the at least one resource used to perform said task to generate a checksum.

20. The method of claim 19, further comprising routing a result of a completion of said task to said client system, said result comprising said checksum associated with completion of said task, said checksum being indicative of an accuracy associated with one or more resources utilized to perform said task.

21. A method, comprising:
providing an indication to one or more remote systems in a distributed system that a task is available for processing based on a distribution list;
receiving at least one response from said one or more remote systems capable of performing the task responsive to the indication, said response comprising a request for a resource for performing said task, wherein the task is performed upon task information, and wherein the resource is information, other than the task information, used to perform the task;

providing said resource for performing said task to said at least one of said remote systems via a peer to peer connection;

allowing at least one of the remote systems to perform the task based on said received response;

receiving a result of a completion of said task, said result comprising a checksum associated with completion of said task, said checksum being indicative of the correctness of one or more resources utilized to perform said task;

receiving data relating to the resource used to perform said task;

determining, based upon the received result, the data relating to the resource used to perform said task and the checksum received from the at least requesting remote system, whether the resource used to perform the task was a proper resource; and indicating to said at least one of said remote systems, in response to determining that proper resources were not used to perform the task, that the task is available for processing.

22. The method of claim 21, further comprising performing a multicast request to re-perform said task based upon the coherency of said checksum.

23. A computer readable program storage device encoded with instructions that, when executed by a computer, performs a method, comprising:

indicating to one or more remote systems in a distributed system that a task is available for processing based on a distribution list;

receiving at least one response from at least one of said one or more remote systems capable of performing the task responsive to the indication, said response comprising a request for a resource for performing said task, wherein the task is performed upon task information, and wherein the resource is information, other than the task information, used to perform the task;

providing said resource for performing said task to said at least one of said remote system;

prompting at least the requesting remote system to perform the task in response to providing the resource;

receiving data relating to the resource used to perform said task;

determining, based upon the received data relating to the resource used to perform said task, whether the resource used to perform the task was a proper resource based at least upon a checksum received from the requesting remote system; and indicating to the one or more remote systems, in response to determining that proper resources were not used to perform the task, that the task is available for processing.

24. The computer readable program storage device encoded with instructions that, when executed by a computer, performs the method of claim 23, wherein further comprising allowing at least one of the remote systems to perform the task based on said received response.

25. The computer readable program storage device encoded with instructions that, when executed by a computer, performs the method of claim 24, further comprising receiving a result of a completion of said task, said result comprising a checksum associated with completion of said task, said checksum being indicative of an accuracy associated with one or more resources utilized to perform said task.

26. The computer readable program storage device encoded with instructions that, when executed by a computer, performs the method of claim 24, wherein said distribution list comprises destination addresses associated with said one or more remote systems, wherein indicating to said one or more remote systems comprises providing a message to a router that, responsive to the message, transmits at least a portion of the message to a plurality of the remote systems based on the distribution list.

27. The computer readable program storage device encoded with instructions that, when executed by a computer, performs the method of claim 23, wherein providing said resource for performing said task to said at least one of said remote system comprises providing said resource from at least one of a second remote system and a client system to said at least one of said remote system.

28. The computer readable program storage device encoded with instructions that, when executed by a computer, performs the method of claim 27, wherein providing said resource further comprises providing said resource via a peer to peer platform.

29. An apparatus, comprising:

means for indicating to one or more remote systems in a distributed system that a task is available for processing based on a distribution list;

means for receiving at least one response from at least one of said one or more remote systems capable of performing the task responsive to the indication, said response comprising a request for a resource for performing said task, wherein the task is performed upon task information, and wherein the resource is information, other than the task information, used to perform the task;

means for providing said resource for performing said task to said at least one of said remote system;

means for prompting at least the requesting remote system to perform the task in response to providing the resource;

means for receiving data relating to the resource used to perform said task;

means for determining, based upon the received data relating to the resource used to perform said task, whether the resource used to perform the task was a proper resource based at least upon a checksum received from the requesting remote system; and means indicating to the one or more remote systems, in response to determining that proper resources were not used to perform the task, that the task is available for processing.

30. An apparatus, comprising:

an interface adapted to communicate with one or more remote systems; and a control unit communicatively coupled to the interface, the control unit adapted to:

indicate to one or more remote systems in a distributed system that a task is available for processing based on a distribution list;

receive at least one response from at least one of said one or more remote systems capable of performing the task responsive to the indication, said response comprising a request for a resource for performing said task, wherein the task is performed upon task information, and wherein the resource is information, other than the task information, used to perform the task;

provide said resource for performing said task to said at least one of said remote system;

receive data relating to the resource used to perform said task;

receive an indication from one or more client systems in a distributed system that a task is available for processing based on a distribution list;

transmit at least one response to at least one of said one or more client systems indicating the control unit is capable of performing the task responsive to the indication, said response comprising a request for a resource for performing said task;

transmit data relating to the resource used to perform said task;

receive a checksum relating to the resource used to perform said task from the at least one of said one or more client systems;

determine, based at least upon the received checksum, whether the resource used to perform the task was a proper resource; and indicate to the one or more remote systems, in response to determining that proper resources were not used to perform the task, that the task is available for processing.

31. The apparatus of claim 30, wherein the task is a compilation task, and wherein the control unit is adapted to multicast a message to a plurality of the remote systems on a network that a compilation task is available.

32. The apparatus of claim 31, wherein the control unit is adapted to indicate a threshold criterion that said one or more remote systems should satisfy and further adapted to receive at least one response from said one or more remote systems that satisfy the threshold criterion.

33. The apparatus of claim 32, wherein the control unit is adapted to indicate at least one of a minimum processing speed, a memory amount, a resource availability to perform said task, and a network speed that is desired for said one or more remote systems.

34. The apparatus of claim 30, wherein the control unit is adapted to identify the task that is available for processing in a queue that is accessible by one or more of the remote systems.

35. The apparatus of claim 30, wherein the control unit is adapted to allow at least one of the remote systems to perform the task based on said received response.

36. The apparatus of claim 35, wherein the control unit is adapted to receive a result of a completion of said task, said result comprising a checksum associated with completion of said task, said checksum being indicative of an accuracy associated with one or more resources utilized to perform said task.

37. A distributed compilation system, comprising:
one or more remote systems;
a client system adapted to:
indicate to one or more remote systems in a distributed system that a task is available for processing based on a distribution list;
receive at least one response from at least one of said one or more remote systems capable of performing the task responsive to the indication, said response comprising a request for a resource for performing said task, wherein the task is performed upon task information, and wherein the resource is information, other than the task information, used to perform the task;
provide said resource for performing said task to said at least one of said remote system;
receive data relating to the resource used to perform said task; and
determine, based upon the received data relating to the resource used to perform said task, whether the resource used to perform the task was a proper resource based at least upon a checksum received from the at least one of said one or more remote systems; and
indicate to the one or more remote systems, in response to determining that proper resources were not used to perform the task, that the task is available for processing.

38. The distributed compilation system of claim 37, wherein the client system multicasts a message to said one or more remote networks over a data network.

39. The distributed compilation system of claim 38, wherein said data network is a peer to peer network.

40. The distributed compilation system of claim 37, wherein at least one of the remote systems is adapted to:
detect an indication from the client system that a compilation task is available for processing;
determine if said at least one remote system is capable of processing the compilation task, determining whether said at least one remote system is capable of processing the compilation comprising determining whether said remote system possesses sufficient resources to perform said task; and
process the compilation task for the client system in response to determining that at least one remote system is capable of processing the compilation task.

41. The distributed compilation system of claim 40, wherein said at least one of the remote systems is adapted to multicast a request for a resource in response to a determination that said remote system does not possess at least one resource to perform said task.

42. The distributed compilation system of claim 41, wherein said at least one of the remote systems is capable of receiving a missing resource to perform said task from at least one of another remote system operatively coupled to said distributed compilation system and said client system.

43. The distributed compilation system of claim 40, wherein said at least one of the remote systems is capable of generating a checksum relating to the results from completion of said task and sending said checksum to said client system.

44. The distributed compilation system of claim 40, wherein said client system is capable of determining an accuracy associated with one or more resources utilized to perform said task.

\* \* \* \* \*